(12) United States Patent
DeLaurier et al.

(10) Patent No.: US 10,872,458 B1
(45) Date of Patent: Dec. 22, 2020

(54) GRAPHICS SURFACE ADDRESSING

(71) Applicant: Apple Inc., Cupertino, CA (US)

(72) Inventors: Anthony P. DeLaurier, Los Altos, CA (US); Michael J. Swift, Brooklyn, NY (US); Michal Valient, San Jose, CA (US); Robert S. Hartog, Windermere, CA (US); Tyson J. Bergland, Sunnyvale, CA (US); Gokhan Avkarogullari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/563,518

(22) Filed: Sep. 6, 2019

(51) Int. Cl.
*G06T 15/04* (2011.01)
*G06F 12/1009* (2016.01)
*G06T 1/60* (2006.01)
*G06F 9/38* (2018.01)
*G06T 15/00* (2011.01)
*G06F 12/0811* (2016.01)
*G06F 9/50* (2006.01)
*G06T 11/00* (2006.01)

(52) U.S. Cl.
CPC ............ *G06T 15/04* (2013.01); *G06F 9/3877* (2013.01); *G06F 9/5016* (2013.01); *G06F 12/0811* (2013.01); *G06F 12/1009* (2013.01); *G06T 1/60* (2013.01); *G06T 11/001* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 5,905,509 | A * | 5/1999 | Jones | ................... G06F 12/1027 345/501 |
| 7,746,352 | B2 * | 6/2010 | Everitt | ................... G06T 11/001 345/552 |
| 7,884,829 | B1 * | 2/2011 | Van Dyke | ............... G06F 12/10 345/544 |
| 8,593,467 | B2 | 11/2013 | Schreyer et al. | |
| 9,959,214 | B1 * | 5/2018 | Habusha | ............. G06F 12/1009 |

(Continued)

*Primary Examiner* — Joni Hsu
(74) *Attorney, Agent, or Firm* — Kowert, Hood, Munyon, Rankin & Goetzel, P.C.

(57) ABSTRACT

Techniques are disclosed relating to memory allocation for graphics surfaces. In some embodiments, graphics processing circuitry is configured to access a graphics surface based on an address in a surface space assigned to the graphics surface. In some embodiments, first translation circuitry is configured to access one or more entries in a set of multiple translation entries for pages of the surface space (where the translation entries are stored using addresses in a virtual space and map pages of the surface space to the virtual space) and translate address information for the surface space to address information in the virtual space based on one or more of the translation entries. In some embodiments, the graphics processing circuitry is configured to provide an address for the access to the graphics surface based on translation by the first translation circuitry and second translation circuitry configured to translate the address in the virtual space to an address in a physical space of a memory configured to store the graphics surface. The disclosed techniques may allow sparse allocation of large graphics surfaces, in various embodiments.

19 Claims, 6 Drawing Sheets

(56) References Cited

U.S. PATENT DOCUMENTS

| | | | |
|---|---|---|---|
| 10,037,228 B2 | 7/2018 | Barrow-Williams et al. | |
| 2011/0157207 A1* | 6/2011 | Hall | G06T 15/04 |
| | | | 345/582 |
| 2016/0140043 A1* | 5/2016 | Mukherjee | G06F 12/1009 |
| | | | 711/123 |
| 2018/0173641 A1* | 6/2018 | Parker | G06F 21/72 |
| 2018/0374188 A1 | 12/2018 | Lv et al. | |
| 2019/0066352 A1* | 2/2019 | Kazakov | G06T 15/80 |

\* cited by examiner

GRAPHICS SURFACE ADDRESSING

BACKGROUND

Technical Field

This disclosure relates generally to memory allocation and more particularly to multi-layer address translation for graphics surfaces.

Description of the Related Art

Graphics processors often use surfaces such as textures to determine pixel attributes for scenes being rendered. Surfaces often include large amounts of data (e.g., for high resolution images), so allocating memory space for a surface in certain scenarios may negatively affect other processing.

Figure 1:
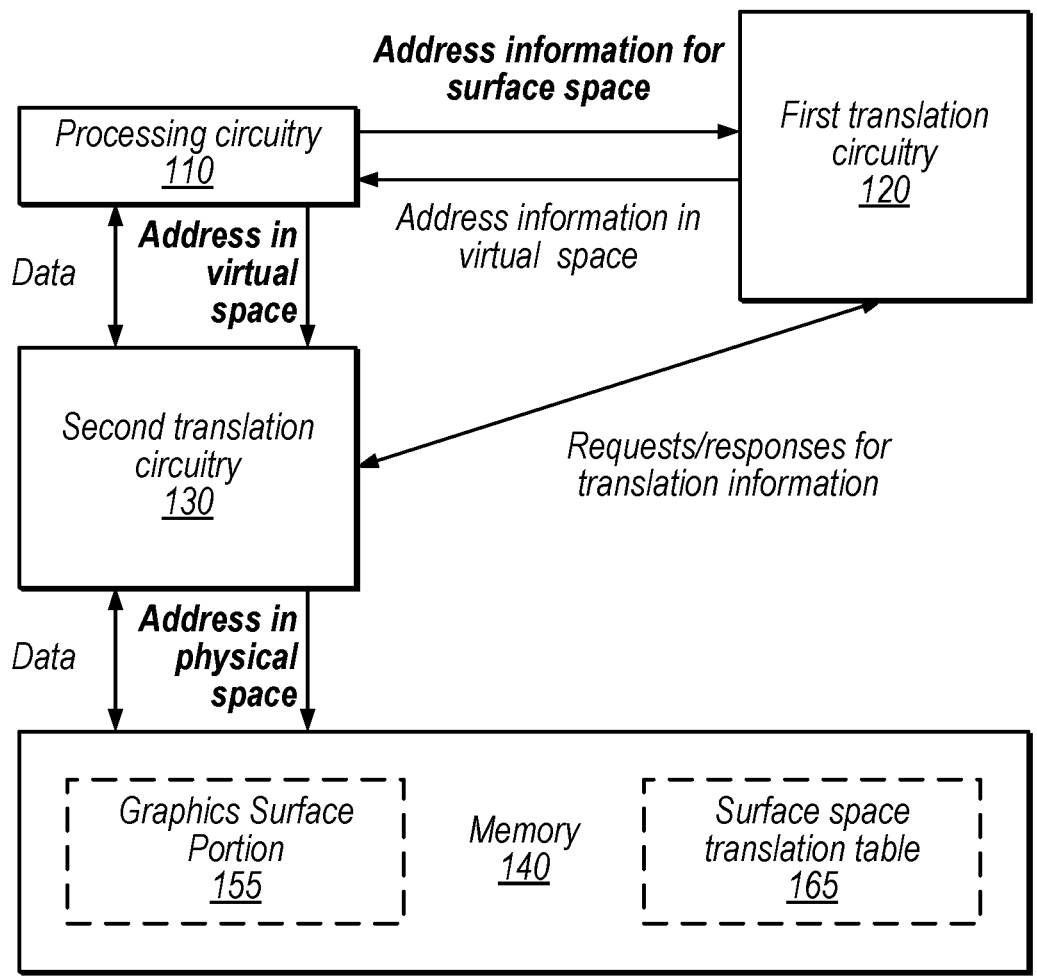
FIG. 1 is a block diagram illustrating example multi-layer translation circuitry configured to process addresses in a surface space, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "translation circuit configured to translate an address" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics surfaces such as textures are often used to determine pixel attributes for a scene being rendered. For example, a graphics processor may map scene coordinates to texture coordinates and sample texels near those texture coordinates using various techniques or filters to determine pixel attributes. Some textures may include substantial amounts of data, e.g., for high-resolution textures. In disclosed embodiments, a system is configured to use graphics surfaces without allocating memory space for the entire surface. Note that surfaces may have three (or more) dimensions, e.g., when multiple mipmaps are generated to represent different levels of detail for a texture, as is well understood to those of skill in the art.

Rather than being mapped directly into a virtual space, in some embodiments, surfaces with sparse allocation may have their own surface space. The surface space may be unique to a given surface and multiple surface spaces for different surfaces may be mapped to the virtual space. In some embodiments, the surface space is mapped to a virtual space in sparse page granules using a translation table for each sparse surface. In some embodiments, pages of surface space are mapped to contiguous pages in virtual space, which may allow translations using a base address and offset. Accesses with addresses in the surface space may result in multiple translations, e.g., a first translation to a virtual space and a second translation to a physical space (where the second translation may be similar to other accesses that begin with an address in the virtual space). Example surface, virtual, and physical spaces are discussed in detail below with reference to FIG. 2. Note that certain pages of the surface space may not be allocated when sparsely allocating a surface, in various embodiments, and accesses to those pages may be detected and properly handled. These techniques may allow use of large surfaces without allocating memory space for the entire surface, in various embodiments. In some embodiments, accesses to un-mapped pages of the sparse surface may be detected by a first set of translation circuitry and may avoid bandwidth or allocation impacts of these accesses for a shared data cache.

FIG. 1 is a block diagram illustrating example multi-layer translation circuitry configured to handle addresses in a surface space, according to some embodiments. In the illustrated embodiment, a device includes processing circuitry 110, first translation circuitry 120, second translation circuitry 130, and memory 140. In the illustrated embodiment, first translation circuitry 120 is configured to translate between addresses in surface space and addresses in virtual space, while second translation circuitry 130 is configured to translate between addresses in virtual space and addresses in physical space.

Processing circuitry 110, in some embodiments, is configured to access sparsely allocated surfaces in memory 140. Note that memory 140 may be part of a cache/memory hierarchy. As is well-understood in the art, the device may implement a virtual space that is larger than the actual physical space provided by memory 140. Non-limiting examples of processing circuitry 110 include a texture processing unit (TPU) or a pixel back-end (PBE). In some embodiments, sparse addressing may be available to only a portion of the processing circuitry included in a device (e.g., this functionality may be available to the TPU and PBE but not to other circuitry such as programmable shader pipelines). In the illustrated embodiment, processing circuitry 110 is configured to provide address information for surface space to first translation circuitry 120 when accessing a sparsely allocated surface. This address information may include the address of a translation table for the surface space, for example.

First translation circuitry 120, in the illustrated embodiment, is configured to receive the address information for the surface space and provide corresponding address information in virtual space to processing circuitry 110. In some embodiments, first translation circuitry 120 is configured to provide this translation based on surface space translation table 165 stored in memory 140, which may be stored using addresses in virtual space and therefore require a translation to addresses in physical space before being accessed. In some embodiments, this translation table 165 is populated by a graphics program being executed. In some embodiments, first translation circuitry 120 is configured to cache translation table data, as discussed in further detail below with reference to FIG. 3. In the illustrated embodiment, first translation circuitry 120 is configured to make requests and receive responses relating to translation information via second translation circuitry 130 (e.g., based on an address being accessed in surface space translation table 165, in virtual space). Note that if a page in the surface space is not mapped, first translation circuitry 120 may indicate this situation to processing circuitry 110 instead of providing address information.

In the illustrated embodiment, processing circuitry 110 receives the address information in virtual space from the first translation circuitry 120 and provides an address in virtual space to second translation circuitry 130 based on the address information. For example, if the address information in virtual space from the translation circuitry 120 is an address in virtual space for a sparse page in the surface space, processing circuitry 110 may generate the access address in virtual space based on a computed offset within the surface space and the virtual address of the sparse page. In other embodiments, the address information generated by the first translation circuitry 120 may specifically include the address in virtual space to be provided to the second translation circuitry 130 (for example, in embodiments in which processing circuitry 110 sends the computed offset to translation circuitry 120).

Second translation circuitry 130, in the illustrated embodiment, is configured to receive addresses in virtual space and translate them physical addresses, e.g., a physical address used to store the data to be accessed in graphics surface portion 155 (stored in memory 140). In some embodiments, second translation circuitry 130 is included in a memory management unit (MMU). Second translation circuitry 130 may use any of various appropriate translation techniques to translate the address in virtual space to an address in physical space. In some embodiments, second translation circuitry 130 may implement traditional paging techniques, which may allow use of first translation circuitry 120 with existing MMU designs. Second translation circuitry 130 may store a page table in memory 140, which may be initially addressed using addresses in physical space (unlike surface space translation table 165, which is initially addressed using addresses in virtual space). In the illustrated embodiment, the second translation circuitry 130 provides the physical address to memory 140, which reads or writes data using the physical address (in the case of a read, second translation circuitry 130 provides the read data to processing circuitry 110, in the illustrated example, and may provide a completion signal for a write).

In some embodiments, processing circuitry 110 is also configured to access traditionally-allocated surfaces within the virtual space. The surfaces may not be assigned their own surface space, but rather are allocated directly in the virtual space. For example, control information may indicate whether or not surfaces are sparsely allocated. When accessing a surface that is not sparsely allocated, processing circuitry 110 may provide an address in virtual space directly to second translation circuitry 130 without using first translation circuitry 120.

Given that a graphics program may sparsely allocate a surface (e.g., provide mappings for only a portion of the pages of the surface space), the address information from processing circuitry 110 to first translation circuitry 120 may correspond to a page that is not mapped by the surface space translation table 165. In this scenario, first translation circuitry 120 may provide a signal to processing circuitry 110 indicating the lack of a mapping. Other circuitry or the graphics program being executed may take various actions based on this indication. For example, if processing circuitry 110 is a texture processing unit, it may filter with a constant color for unmapped texels and send a negative acknowledgement (NACK) to a programmable shader executing the graphics program. The shader may then take various actions, such as mapping the requested page (e.g., when activity counts indicate that the page has been accessed frequency, as discussed in detail below), accessing a lower-resolution portion of the surface (e.g., another mipmap level), etc. In some embodiments, a pixel back end may drop writes to unmapped addresses.

Note that, although various embodiments disclosed herein relate to allocation for a graphics surface, the disclosed techniques may be used for various other data structures, graphics-related or not; graphics surfaces are included for purposes of illustration but are not intended to limit the scope of the present disclosure. Further, the disclosed techniques may be implemented by other types of processors such as central processing units, for example, in addition to or in place of graphics processors.

Figure 2A:
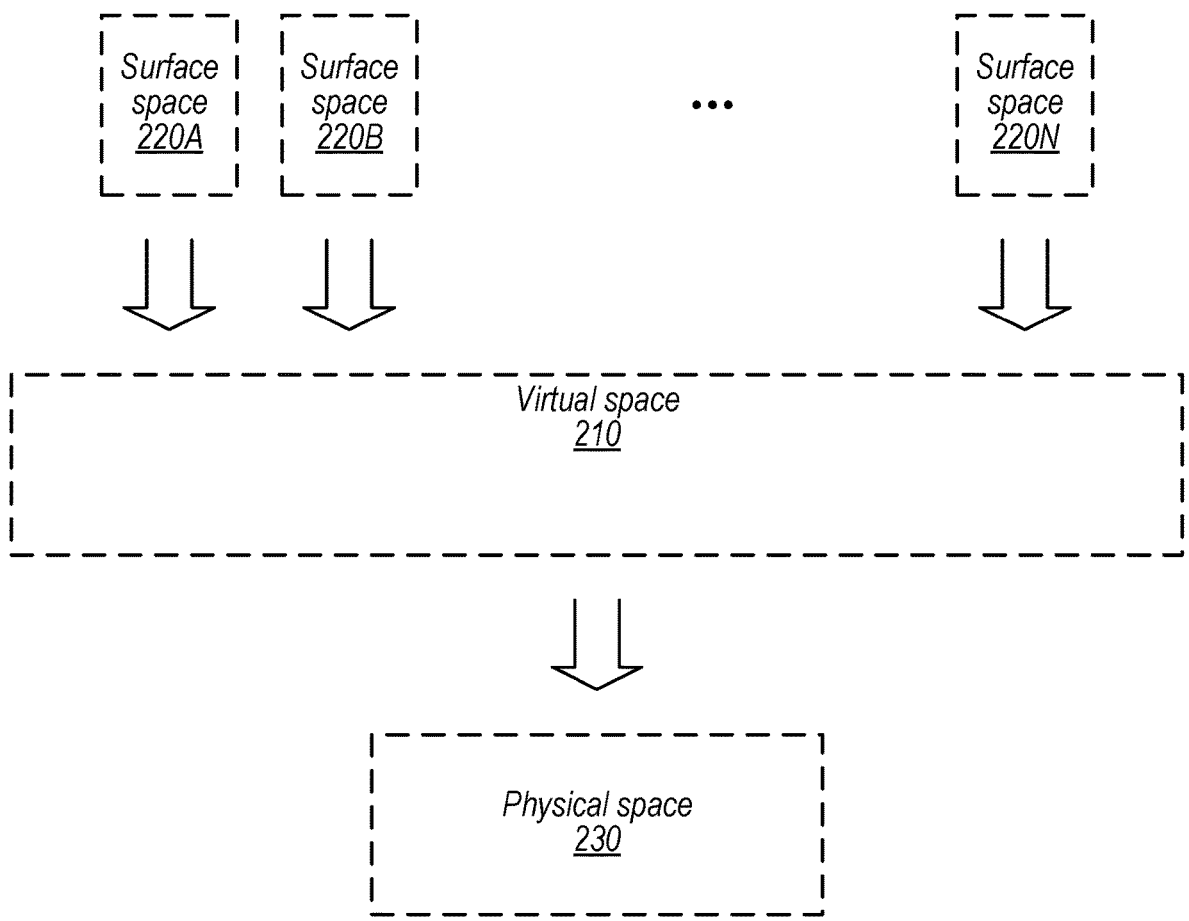
FIG. 2A is a diagram illustrating example surface, virtual, and physical spaces, according to some embodiments.

FIG. 2A is a diagram illustrating example address spaces, according to some embodiments. In the illustrated embodiment, a system implements a virtual space 210, multiple surface space 220A-220N, and a physical space 230. In some embodiments, mapping the surface spaces 220 within the virtual space 210 may provide the benefits of the virtual space (e.g., physical space cannot be accessed outside of the virtual to physical mapping) while allowing less trusted sparse surface allocation. Note that the system may store a translation table for each surface space 220 using addresses in virtual space 210 (and these addresses are translated to addresses in physical space 230 for actual storage) and the system may store a page table for virtual space 210 using addresses in physical space 230.

Figure 2B:
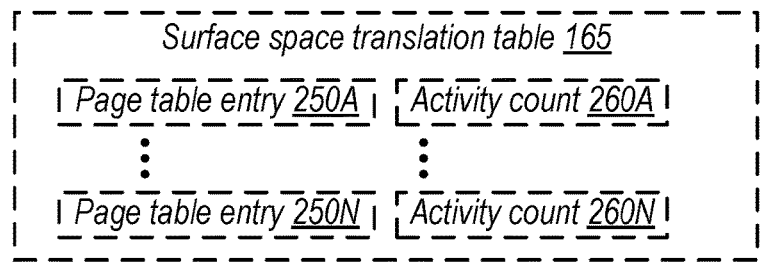
FIG. 2B is a diagram illustrating an example surface space translation table, according to some embodiments.

FIG. 2B is a diagram illustrating an example surface space translation table, according to some embodiments. In the illustrated embodiment, table 165 includes multiple entries 250A-250N and corresponding activity count fields 260A-260N. In some embodiments, there is an entry 250 for each page of a surface space 220. In some embodiments, each entry 250 provides a mapping between a surface space page and a virtual space page or an indication that there is no mapping for the surface space page. Note that in embodiments with different page sizes for surface space and virtual space, entries may indicate mappings between multiple surface space pages and one virtual space page or vice versa. In some embodiments, each entry 250 includes a field indicating whether the page is mapped. Translation circuitry may access the appropriate entry of the table 165 based on the requested address in the surface space 220 (e.g., based on a base address field for the surface space and a determined offset within the space).

Activity count fields 260, in some embodiments, are configured to store activity counts that indicate the number of attempts made to access the corresponding page of the surface space. In some embodiments, a graphics program may use these counts to make decisions regarding which pages of the surface space to map or unmap. Note that activity counts may be updated based on requests to access a page, even when that page is not mapped. Further, activity counts may be maintained based on accesses at various granularities. For example, accesses of a threshold number of bytes may be guaranteed to increment a corresponding activity count, but smaller accesses may also cause increments, e.g., based on caching behavior in a particular implementation.

In some embodiments, data stored in translation table 165 is interleaved, e.g., with addresses for a first portion of mappings after the base address of the table, followed by addresses for corresponding activity counts, followed by addresses for another portion of mappings, and so on. As discussed above, the base address of table 165 may be an address in the virtual space 210.

Figure 3:
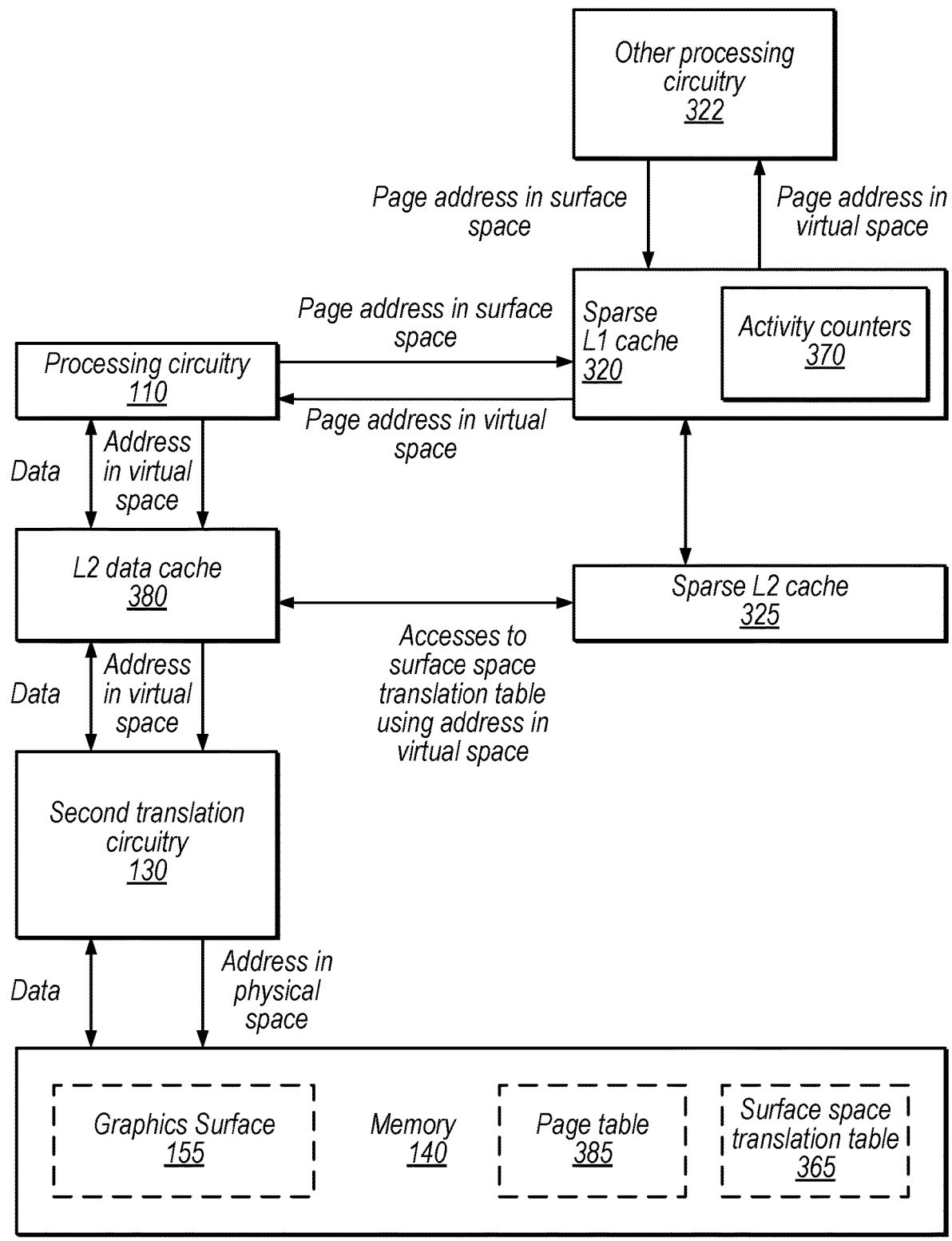
FIG. 3 is a block diagram illustrating a more detailed example of translation circuitry, according to some embodiments.

FIG. 3 is a block diagram illustrating a more detailed example of translation circuitry, according to some embodiments. Note that elements having the same numbering as in FIG. 1 may be configured as discussed above with reference to FIG. 1. In the illustrated example, a device includes processing circuitry 110, other processing circuitry 322, sparse level 1 (L1) cache 320, sparse level 2 (L2) cache 325, L2 data cache 380, second translation circuitry 130, and memory 140.

Other processing circuitry 322 is shown to illustrate that sparse translation circuitry may be shared by multiple processing circuits, e.g., a texture processing unit, pixel back end, etc. In various embodiments, sparse translation circuitry may be configured to translate addresses for any of various appropriate numbers of client circuits.

In the illustrated embodiment, the translation circuitry that is configured to translate from an address in the surface space to the virtual space includes multiple cache levels 320 and 325. In some embodiments, both the sparse L1 cache 320 and sparse L2 cache 325 are configured to store entries from surface space translation table 365. The sparse L2 cache 325 may be a larger cache configured to cache more translation entries than the sparse L1 cache 320.

In some embodiments, an address in surface space includes a page base address, an offset, and a page size. In some embodiments, processing circuitry 110 sends a page address in surface space to sparse L1 cache 320 to determine if the page is mapped. In other embodiments, processing circuitry 110 determines a translation table entry for a page being accessed and sends the address of the translation table entry in virtual space to sparse L1 cache 320. In some embodiments, the L1 cache includes control circuitry configured to determine an address in virtual space based on a page table entry 250. In some embodiments, this includes first determining the virtual space address of the corresponding page table entry 250, determining if that entry is cached (e.g., using a portion of the virtual space address as a tag), and determining the address of the sparse page in virtual space based on the contents of the page table entry 250, if the entry is cached. If the page table entry 250 is not cached in sparse L1 cache 320, the control circuitry may send the request to sparse L2 cache 325 which may return the entry if there is a hit, or access surface space translation table 365 to attempt to retrieve the page table entry if there is a miss. In the illustrated embodiment, if there is a mapping, cache 320 returns the page address in virtual space, which processing circuitry 110 may use to generate an address in virtual space (e.g., based on a computed offset and received address). In other embodiments, L1 cache 320 may send and receive address information at other granularities, e.g., including a specific address for a request by processing circuitry 110.

In some embodiments, accesses to sparse L2 cache 325 rarely miss, e.g., due to its size and pre-fetching techniques. For example, the system may pre-fetch nearby page table entries 250 in a 2D extent of a surface into sparse L2 cache 325, before corresponding addresses are requested. Therefore, the translation circuitry may generate an address in virtual space for even the first access to a page in surface space, without accessing the translation table in memory 140. In some embodiments, this may advantageously allow sparse translations with low latency, e.g., with misses only the first time a 2D extent of a surface is accessed.

In the illustrated embodiment, the system includes an L2 data cache 380 which operates based on addresses in virtual space. L2 data cache 380 may be a cache shared by multiple blocks, e.g., a programmable shader, a texture processing unit, etc. Sparse L2 cache 325 may access surface space translation table 365 via second translation circuitry 130 directly, or via L2 data cache 380, as shown in the illustrated example. Speaking generally, using side band sparse translation circuitry (e.g., caches 320 and 325) to map pages in surface space may avoid interference with L2 data cache 380 for other operations.

In the illustrated embodiment, control circuitry in sparse L1 cache 320 is also configured to maintain activity counters 310 for cached translation entries. Activity counters may be maintained at any of various appropriate data granularities. In some embodiments, for each request in a surface space, sparse L1 cache 320 increments one or more corresponding activity counters. When the system evicts entries from sparse L1 cache 320, the system may store the corresponding activity counters in sparse L2 cache 325 or surface space translation table 365. Note that various caches discussed herein may use various caching implementations, including using different associativity, using write-back or write-through techniques, using different replacement policies, etc.

In the illustrated embodiment, memory 140 also stores page table 385, which may be addressed in physical space and used by second translation circuitry 130 to translate addresses in virtual space to addresses in physical space.

Example Method

Figure 4:
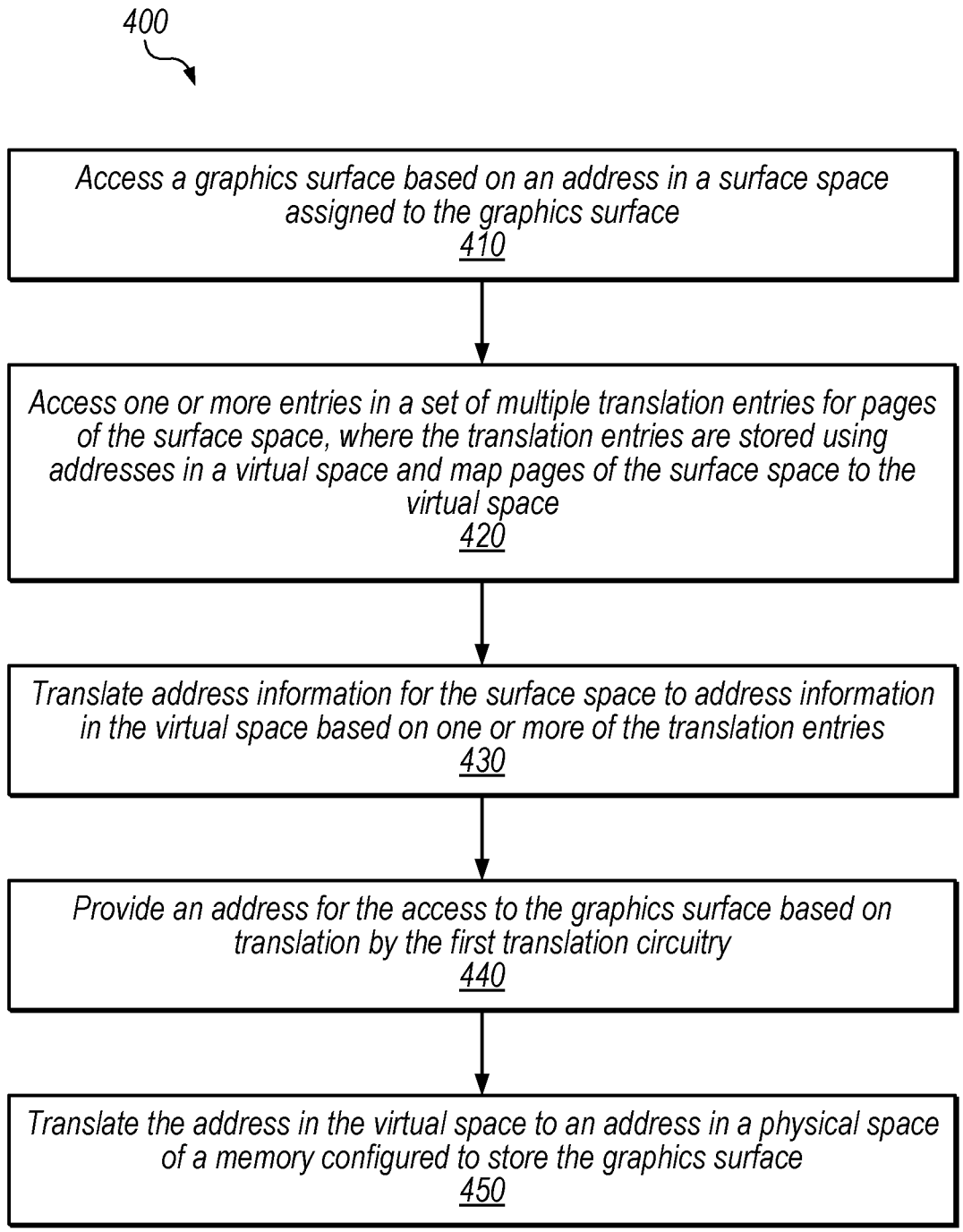
FIG. 4 is a flow diagram illustrating an example method for accessing a surface using a surface space, according to some embodiments.

FIG. 4 is a flow diagram illustrating an example method for accessing a surface using a surface space, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, graphics processing circuitry accesses a graphics surface based on an address in a surface space assigned to the graphics surface. In some embodiments, portions of the surface space are mapped to a virtual space, which may advantageously provide the security of the virtual space while allowing sparse allocation of surfaces. In some embodiments, the surface space is dedicated to the graphics surface such that other surfaces do not use the surface space. In some embodiments, the graphics surfaces includes elements in more than two dimensions. For example, the surface may be a set of mipmaps for a texture that represent the texture at different levels of detail. In other situations or embodiments, surfaces may be single-dimensional or two-dimensional.

At 420, in the illustrated embodiment, first translation circuitry accesses one or more entries in a set of multiple translation entries for pages of the surface space, where the translation entries are stored using addresses in a virtual space and map pages of the surface space to the virtual space. Note that the first translation circuitry may maintain all or part of the set of entries internally (e.g., using one or more dedicated caches) or may maintain the entries externally, e.g., in memory 140 or some other memory. The page table entries 250 of FIG. 2B are examples of translation entries. In some embodiments, the set of translation entries is configurable by graphics instructions executed by the apparatus. For example, a graphics program may allocate or modify the page table entries 250. In some embodiments, a page table entry includes information indicating that a page in surface space is not mapped, e.g., if the surface is sparsely allocated.

At 430, in the illustrated embodiment, the first translation circuitry translates address information for the surface space to address information in the virtual space based on one or more of the translation entries. For example, the address information for the surface space may specify (1) a base address in virtual space for the translation table for a surface space and (2) a computed offset within the surface space. This may be used to generate an address, in virtual space, of the appropriate translation entry in the table. The translation entry may provide the address of the sparse page in virtual space, which may be used in conjunction with the computed offset within the surface space to generate a virtual address for the access to the surface. Note that different parts of the computation in this example may be split between processing circuitry 110 and translation circuitry 120, in different embodiments. For example, processing circuitry 110 may send address information with both the computed offset and the base address in virtual space of the translation table in one embodiment, or may compute and send the address of the translation entry in virtual space in another embodiment.

At 440, in the illustrated embodiment, the graphics processing circuitry provides an address for the access to the graphics surface based on translation by the first translation circuitry. For example, the graphics processing circuitry may provide the address for the access in virtual space to second translation circuitry 130.

At 450, in the illustrated embodiment, second translation circuitry translates the address in the virtual space to an address in a physical space of a memory configured to store the graphics surface. The system may then access data of the graphics surface using the address in physical space.

In some embodiments, the first translation circuitry is configured to maintain the set of multiple translation entries in a memory (e.g., the memory that implements the physical space) and is configured to cache at least a portion of the set of multiple translation entries in a cache. In some embodiments, the first translation circuitry uses multiple cache levels for translation entries, e.g., a first level cache and a second level cache, where the second level cache is configured to cache data for a larger number of translation entries than the first level cache. In some embodiments, the system is configured to pre-fetch data for one or more translation entries into the second level cache prior to receiving access requests corresponding to the one or more translation entries.

In some embodiments, the graphics circuitry is configured to access other graphics surfaces that do not use multi-layer translation. For example, the graphics processing circuitry may access another graphics surface stored in the memory using an address in the virtual space without using the first translation circuitry and the second translation circuitry may translate the address in the virtual space to an address in physical space.

Example Device

Figure 5:
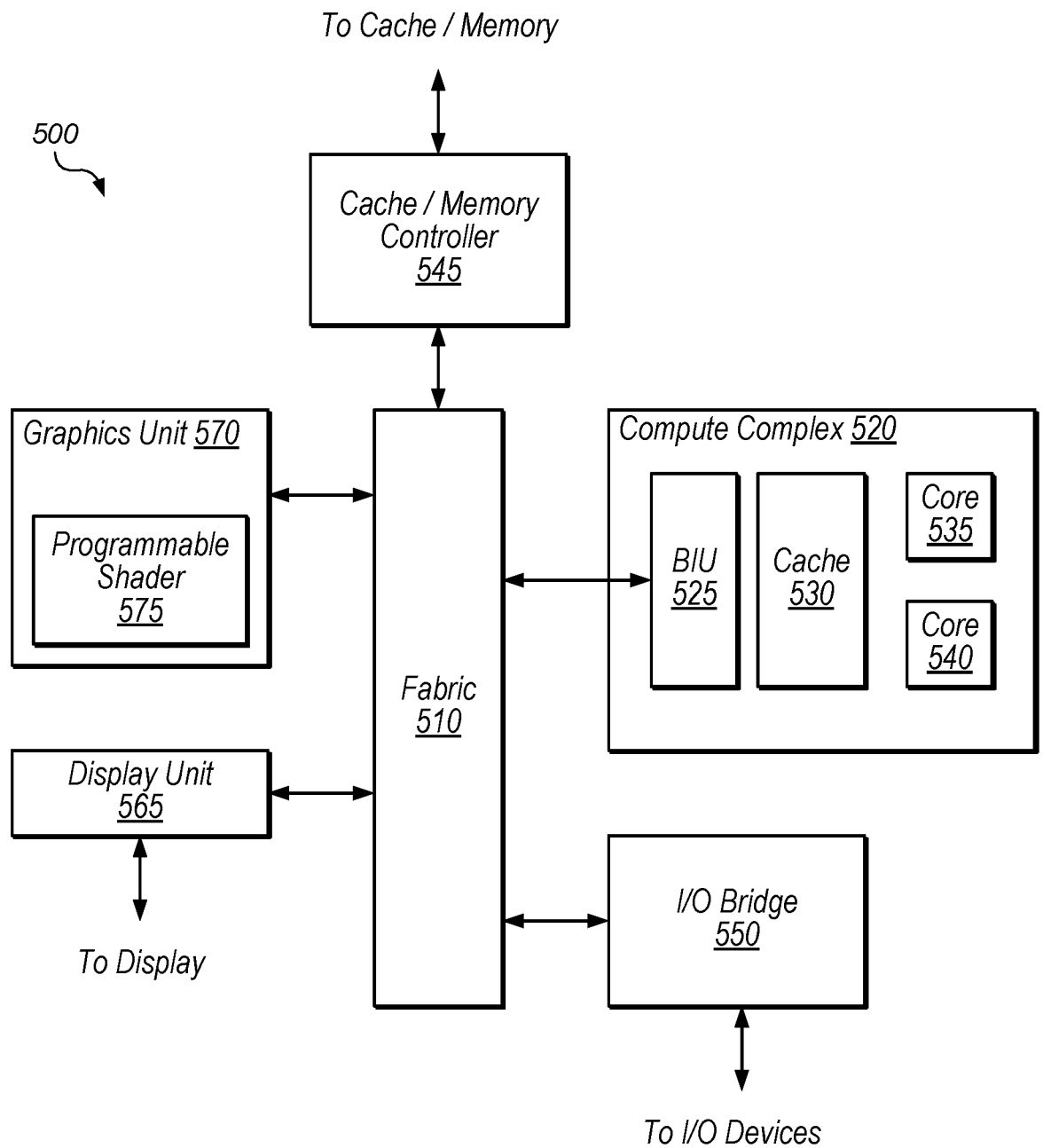
FIG. 5 is a block diagram illustrating an example computing device that may include one or more graphics processors, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 570, and display unit 565. In some embodiments, device 500 may include other components (not shown) in addition to and/or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 570 may be described as "coupled to" a memory through fabric 510 and cache/memory controller 545. In contrast, in the illustrated embodiment of FIG. 5, graphics unit 570 is "directly coupled" to fabric 510 because there are no intervening elements.

Graphics unit 570 may include one or more processors and/or one or more graphics processing units (GPU's). Graphics unit 570 may receive graphics-oriented instructions, such as OPENGL®, Metal, or DIRECT3D® instructions, for example. Graphics unit 570 may execute specialized GPU instructions or perform other operations based on the received graphics-oriented instructions. Graphics unit 570 may generally be configured to process large blocks of data in parallel and may build images in a frame buffer for output to a display. Graphics unit 570 may include transform, lighting, triangle, and/or rendering engines in one or more graphics processing pipelines. Graphics unit 570 may output pixel information for display images. Programmable shader 575, in various embodiments, may include highly parallel execution cores configured to execute graphics programs, which may include pixel tasks, vertex tasks, and compute tasks (which may or may not be graphics-related).

In some embodiments, various circuitry discussed above with reference to FIGS. 1-4 is included in graphics unit 570.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 6:
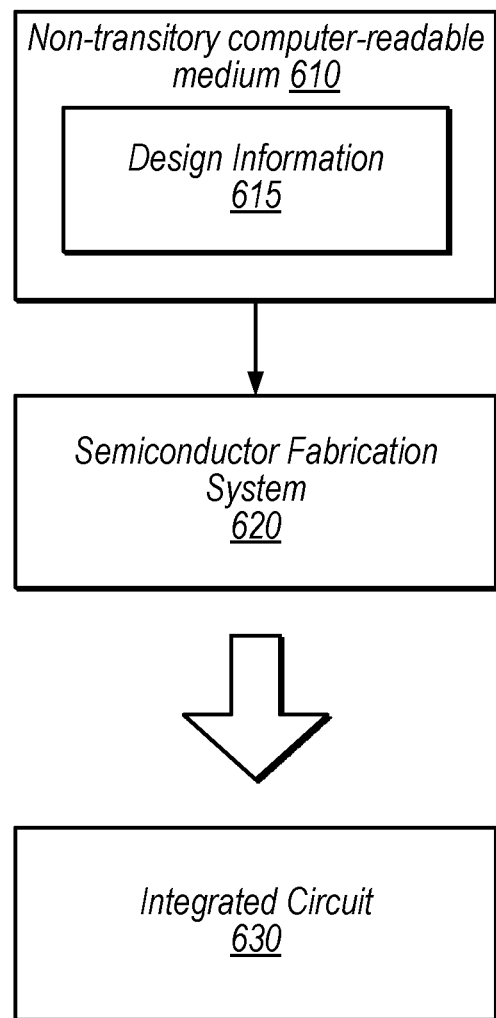
FIG. 6 is a block diagram illustrating an example computer-readable medium that stores circuit design information, according to some embodiments.

FIG. 6 is a block diagram illustrating an example non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable storage medium 610, may comprise any of various appropriate types of memory devices or storage devices. Non-transitory computer-readable storage medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIGS. 1, 3 and 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   graphics processing circuitry configured to access a graphics surface based on an address in a surface space assigned to the graphics surface;
   first translation circuitry configured to:
      access one or more entries in a set of multiple translation entries for pages of the surface space, wherein the translation entries are stored using addresses in a virtual space and map pages of the surface space to the virtual space; and
      translate address information for the surface space to address information in the virtual space based on one or more of the translation entries;
      wherein the translation entries are configurable by a graphics program executed by the apparatus, wherein the graphics program is configured to initially map only a portion of the surface space to the virtual space; and
   wherein the graphics processing circuitry is configured to provide an address for the access to the graphics surface based on translation by the first translation circuitry; and
   second translation circuitry configured to translate the address in the virtual space to an address in a physical space of a memory configured to store the graphics surface.

2. The apparatus of claim 1, wherein the apparatus is configured to assign different surfaces spaces to different graphics surfaces and store respective sets of translation entries for the different surface spaces.

3. The apparatus of claim 1, wherein the first translation circuitry is configured to cache at least a portion of translation information in the set of multiple translation entries in a cache that is dedicated to caching translation information for surface spaces.

4. The apparatus of claim 1, wherein the first translation circuitry is further configured to:
   cache data from translation table entries using a first level cache and a second level cache, wherein the second level cache is configured to cache data for a larger number of translation entries than the first level cache;
   wherein the first level cache is configured to adjust activity count information for cached translation entries based on access requests corresponding to the translation entries.

5. The apparatus of claim 4, wherein the apparatus is configured to pre-fetch data for one or more translation entries into the second level cache prior to receiving access requests corresponding to the one or more translation entries.

6. The apparatus of claim 1, wherein the graphics processing circuitry is further configured to access another graphics surface stored in the memory using an address in the virtual space without using the first translation circuitry.

7. The apparatus of claim 1, wherein the apparatus is configured to maintain activity count information based on accesses to portions of the surface space; and
   wherein the graphics processing circuitry is configured to execute the graphics program to map a previously-unmapped page of the surface space to the virtual space based on activity count information associated with the page of the surface space.

8. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

graphics processing circuitry configured to access a graphics surface based on an address in a surface space assigned to the graphics surface;

first translation circuitry configured to:

access one or more entries in a set of multiple translation entries for pages of the surface space, wherein the translation entries are stored using addresses in a virtual space and map pages of the surface space to the virtual space; and translate address information for the surface space to address information in the virtual space based on one or more of the translation entries;

wherein the translation entries are configurable by a graphics program executed by the circuit, wherein the graphics program initially maps only a portion of the surface space to the virtual space; and wherein the graphics processing circuitry is configured to provide an address for the access to the graphics surface based on translation by the first translation circuitry; and second translation circuitry configured to translate the address in the virtual space to an address in a physical space of a memory configured to store the graphics surface.

9. The non-transitory computer readable storage medium of claim 8, wherein the circuit is configured to assign different surfaces spaces to different graphics surfaces and store respective sets of translation entries for the different surface spaces.

10. The non-transitory computer readable storage medium of claim 8, wherein the first translation circuitry is configured to cache at least a portion of translation information in the set of multiple translation entries in a cache that is dedicated to caching translation information for surface spaces.

11. The non-transitory computer readable storage medium of claim 8, wherein the first translation circuitry is further configured to:

cache data from translation table entries using a first level cache and a second level cache, wherein the second level cache is configured to cache data for a larger number of translation entries than the first level cache.

12. The non-transitory computer readable storage medium of claim 11, wherein the circuit is configured to pre-fetch data for one or more translation entries into the second level cache prior to receiving access requests corresponding to the one or more translation entries.

13. The non-transitory computer readable storage medium of claim 8, wherein the graphics processing circuitry is further configured to access another graphics surface stored in the memory using an address in the virtual space and without using the first translation circuitry.

14. A method, comprising:

accessing, by graphics processing circuitry, a graphics surface based on an address in a surface space assigned to the graphics surface;

configuring, by the graphics processing circuitry based on execution of a graphics program, a set of multiple translation entries, wherein the graphics program is configured to initially map only a portion of the surface space to a virtual space;

accessing, by first translation circuitry, one or more entries in the set of multiple translation entries for pages of the surface space, wherein the translation entries are stored using addresses in the virtual space and map pages of the surface space to the virtual space;

translating, by the first translation circuitry, address information for the surface space to address information in the virtual space based on one or more of the translation entries;

providing, by the graphics processing circuitry, an address for the access to the graphics surface based on translation by the first translation circuitry; and translating, by second translation circuitry, the address in the virtual space to an address in a physical space of a memory configured to store the graphics surface.

15. The method of claim 14, further comprising:

mapping, based on execution of the graphics program, a previously-unmapped page of the surface space to the virtual space based on activity information associated with the page of the surface space.

16. The method of claim 14, further comprising:

maintaining, by the first translation circuitry the set of multiple translation entries in the virtual space and caching data for at least a portion of the set of multiple translation entries in a cache.

17. The method of claim 14, further comprising:

caching data from translation table entries using a first level cache and a second level cache, wherein the second level cache is configured to cache data for a larger number of translation entries than the first level cache.

18. The method of claim 17, further comprising:

pre-fetching data for one or more translation entries into the second level cache prior to receiving access requests corresponding to the one or more translation entries.

19. The method of claim 14, further comprising:

accessing, by the graphics processing circuitry, another graphics surface stored in the memory using an address in the virtual space; and translating, by the second translation circuitry the address in the virtual space to an address in a physical memory, without using the first translation circuitry.

* * * * *